(12) United States Patent
McCollough et al.

(10) Patent No.: US 6,783,835 B2
(45) Date of Patent: Aug. 31, 2004

(54) ELASTOMERIC DAMPING SHEETS

(75) Inventors: Trevor J. McCollough, Minneapolis, MN (US); Wesley E. Revely, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/123,970

(22) Filed: Apr. 16, 2002

(65) Prior Publication Data

US 2002/0110666 A1 Aug. 15, 2002

Related U.S. Application Data

(63) Continuation-in-part of application No. 09/770,474, filed on Jan. 29, 2001, now abandoned.

(51) Int. Cl.[7] ................................................. B32B 3/24

(52) U.S. Cl. ...................... 428/131; 428/132; 428/133; 428/134; 428/135; 428/136; 428/137; 428/138; 428/139; 428/140; 267/141; 267/140.11; 267/292; 267/160; 248/63.6; 248/63.8; 181/207; 181/208

(58) Field of Search ................................ 428/131, 132, 428/133, 134, 135, 136, 137, 138, 139, 140; 267/141, 140.11, 292, 160; 248/636, 638; 181/207, 208

(56) References Cited

U.S. PATENT DOCUMENTS

| 4,776,573 | A | * | 10/1988 | Wolf et al. | ............ | 267/140.11 |
| 4,925,163 | A | | 5/1990 | Wolf et al. | | |
| 5,766,720 | A | | 6/1998 | Yamagishi et al. | | |
| 6,274,219 | B1 | * | 8/2001 | Schuster et al. | ............ | 428/138 |

FOREIGN PATENT DOCUMENTS

EP          637699 A1 *  2/1995  ............. F16F/1/36

* cited by examiner

*Primary Examiner*—William P. Watkins, III
(74) *Attorney, Agent, or Firm*—Kevin W. Cyr; Glenn W. Bowen; Patrick M. Hogan

(57) ABSTRACT

A bulk modulus elastomeric element is employed in the present invention. The material from which the invention is fabricated is formed as a sheet, which has a plurality of channels that run through, or partially through it. The holes in the sheet are angled such that the remaining material may be of a parallelogram shape. The top and bottom surfaces of the particular element may be rectangular, circular, hexagonal, or other shapes, since the shape of the end surface is not important to the invention. An edge of an upper end surface is displaced from a remote edge of the lower surface so that a vertical line from one edge normal to the upper surface, is displaced from the remote edge of the lower surface, so that it preferably does not intersect any part of the lower surface when no forces are applied to the surfaces. However, in some instances, under load, a small overlap at the cross-sectional areas of the upper surface and lower surfaces, may be desirable. A method of determining the desired overlap the elastomeric elements for given applications is also provided.

5 Claims, 4 Drawing Sheets

ELASTOMERIC DAMPING SHEETS

CROSS-REFERENCE TO RELATED PATENT APPLICATION

This is a Continuation-in-Part Application of co-pending U.S. patent application Ser. No. 09/770,474, filed Jan. 29, 2001 now abandoned in the name of Trevor J. McCollough and Wesley E. Revely.

BACKGROUND OF THE INVENTION

This invention relates to unique elastomeric damping sheet geometry and design. Elastomeric materials are employed extensively in applications where shock and vibration must be minimized. Such applications include sports equipment, tools, automobiles, airplanes, and many other types of apparatus. It is also becoming increasingly important to minimize failures due to impact forces applied to electronic equipment, such as digital computers, especially when such equipment is employed in harsh, rugged environments.

Previously, various elastomeric materials have been used, or suggested for use, to provide shock and/or vibration damping, as stated in U.S. Pat. No. 5,766,720 issued in Jun. 16, 1998 to Yamagishi, et. al. These materials include natural rubbers and synthetic resins, such as polyvinylchlorides, polyurethane, polyamides, polystyrenes, copolymerized polyvinyl chlorides, and polyolefine synthetic rubbers, as well as synthetic materials such as urethane, EPDM, styrene-butadiene rubbers, nitrites, isoprene, chloroprenes, propylene, and silicones. The particular type of elastomeric material employed is not critical, but urethane material sold under the trademark Sorbothane© is currently employed. Suitable material is also sold by Aero E.A.R. Specialty Composites, as Isoloss VL. The registrant of the mark Sorbothane© for urethane material is the Hamilton Kent Manufacturing Company (Registration No. 1208333), Kent, Ohio 44240.

The elastomeric elements employed in the prior art were commonly formed into typical geometric 3D shapes, such as spheres, ;squares, right circular cylinders, cones, rectangles, and the like as illustrated in U.S. Pat. No. 5,776,720. These typical geometric shapes, however, did not satisfactorily eliminate the transfer of compressive forces through the damping device, and thus, did not minimize or eliminate shock and vibration to the degree accomplished by the devices of the invention.

BRIEF SUMMARY OF THE INVENTION

In pending U.S. patent application Ser. No. 09/495,693 filed Feb. 1, 2001, now abandoned titled Elastomeric Damping Elements and Applications for Reducing Shock and Vibration, elastomeric damping elements of block shapes were disclosed. These elastomeric damping elements were formed with an elongated parallelogram cross-sectional shape, with a first flat mounting surface that extends parallel to the first flat mounting surface at a second end of the parallelogram cross-section, and is located so that a line drawn normal to one of the flat mounting surfaces will not intercept the other of the flat mounting surfaces. As an option, a space in the interior of the element could be provided, which is filled with particulate or fluid material that may be contained in a deformable package. Other materials that have different damping characteristics than the elastomeric sheet, may be poured into the interior of the element where they solidify.

The elastomeric sheet material of the present invention is formed of a continuous, flat elastomeric sheet or layer that has a plurality of channels that run through it, or, at least partially through it, such that the remaining material is formed with a plurality of structures that when viewed along, at least one, in cross-sectional continuing line of a general parallelogram shape. A method of correlating dimensions of elastomeric damping elements with applied forces to provide effective damping for given applications is also provided.

BRIEF DESCRIPTION OF THE DRAWINGS

The present invention is described by reference to the drawings in which.

DETAILED DESCRIPTION OF THE INVENTION

Figure 1:
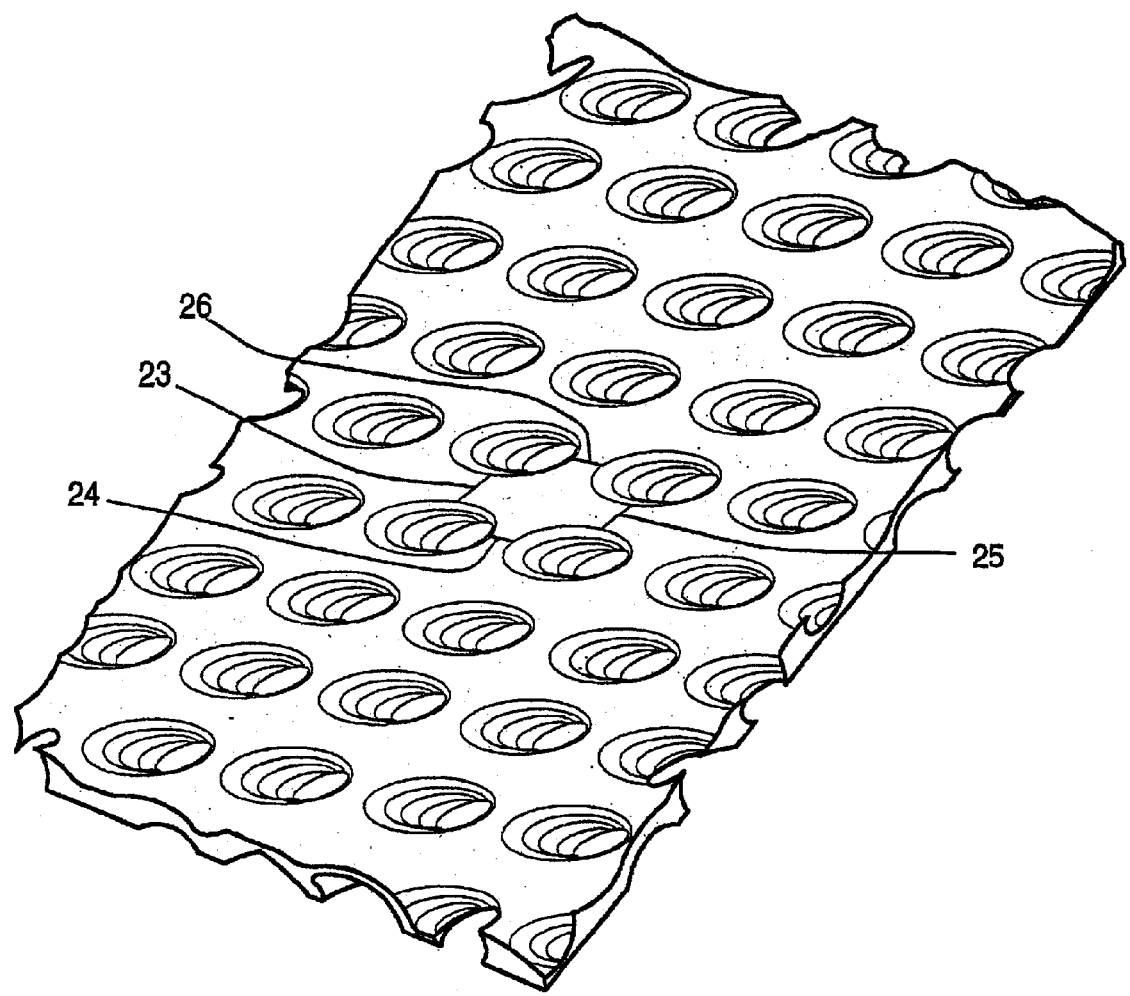
FIG. 1 is a perspective view of an elastomeric sheet material constructed in accordance with the invention.

The elastomeric material employed in the present invention is preferably a bulk modulus elastomeric element which is formed as a sheet 10, as shown in FIG. 1. The elastomeric sheet 10 is provided with a plurality of channels 12 that run through it, or partially through it. The channels 12 in the sheet 10 are angled such that the remaining solid material between the channels is subdivided into an array of solid portions, such as the portion 14 of FIG. 2, portion 14, as shown in FIG. 3, shows that the portion 14 has a cross-sectional parallelogram shape. The parallel sides 16, 18 join the top surface 20 and the bottom surface 22 of the sheet at angles 17, 19 that can be adjusted depending upon application needs. The top and bottom 20, 22 surfaces of the particular portion 14 may be rectangular, circular, hexagonal, or other shapes since the shape of the end surface is not important to the invention. The portion 14 may be formed with straight sides 16, 18 as shown. These sides, however, could be bowed inwardly, or outwardly. The left-hand edge 24 of the upper end surface 20 is displaced from the right-hand edge 26 of the lower surface 22, so that a vertical line 28 from the left edge 24 that is normal to the end surface 20, is displaced from the right edge 26 of the end surface 22, so that it may not intersect any part of the lower end surface 22. In some instances, due to load requirements, some area overlaps between the two end surfaces with an applied static force, may be desirable. If overlap is employed, the portions should allow for a pre-determined amount of buckling due to the combination of the static force and the excess dynamic force impulse.

Figure 2:
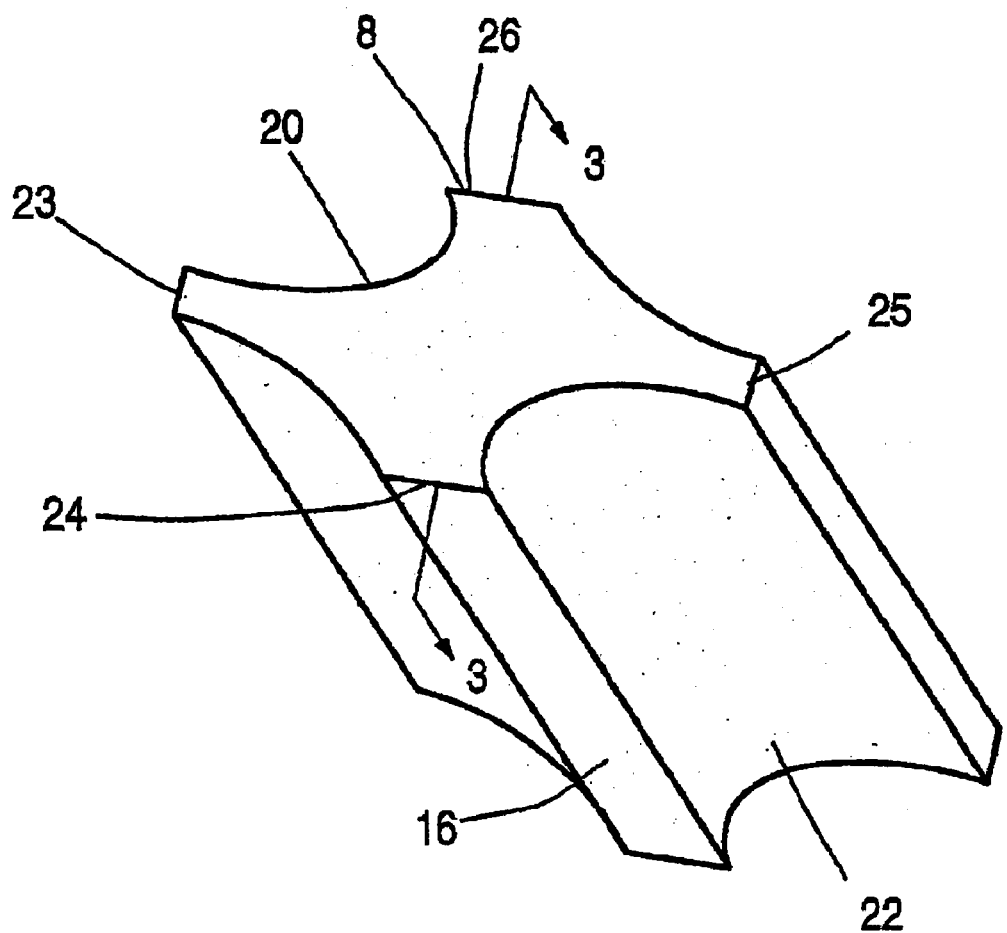
FIG. 2 is an isometric view of one solid portion of the sheet material of FIG. 1 that is defined by cutting a, b, c, d, of FIG. 1.
Figure 3:
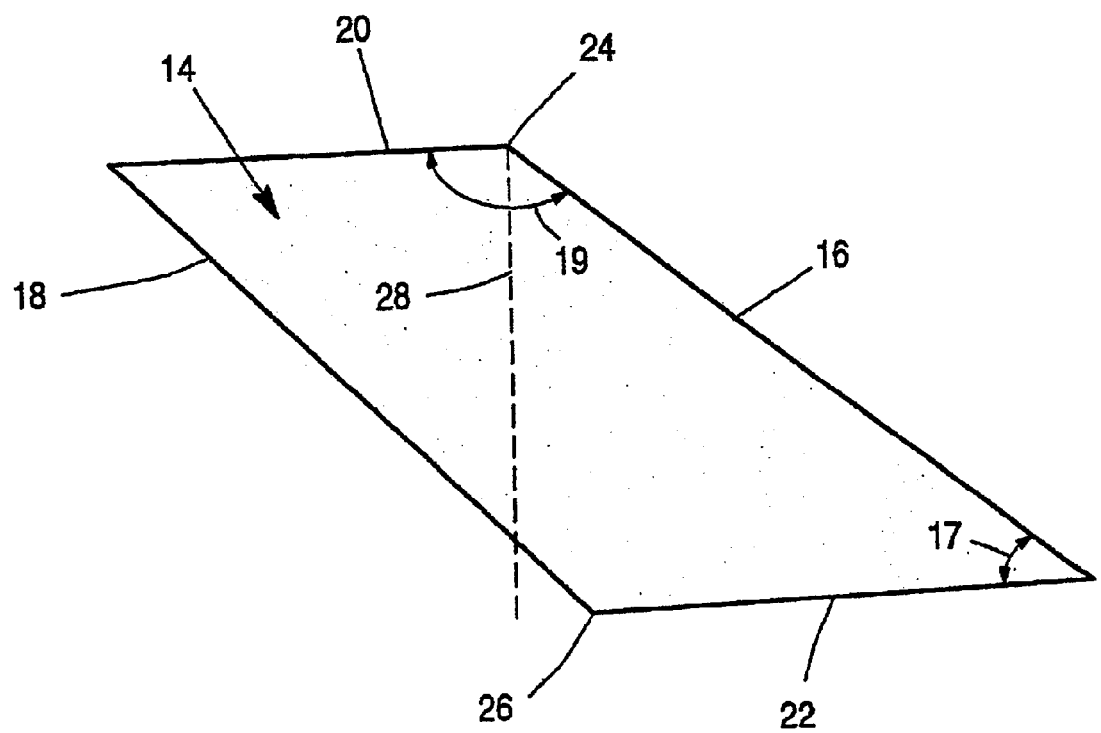
FIG. 3 is a cross-sectional view of the solid portion of FIG. 2 taken along the cutting line 3—3 of FIG. 2.

A downward applied force on the end surface 20 in the vertical direction of FIG. 2 will be translated into a downward and rightward displacement of the upper portion of the portion 14 relative to its lower portion. This transforms the effect of the download force into a horizontal sheer force, which, because of the residual elastomeric nature of the body, will greatly attenuate shock and vibration. This, consequently, minimizes the transmission of compressive forces through the portion 14, especially if no portion of the upper surface 20 overlaps any portion of the lower end surface 22. A material having elastomeric characteristics that differ from those of the outer body, may be used to fill or partially fill, the channels 12. A preferred channel filing material is obtained by pouring liquid Sorbothane® Urethane into the channels 12. When the Sorbothane® Urethane solidifies, the dissimilar material interface improves the damping system as well. If the channels are filled with another material, the 20 channel filling material must be able to stretch or flow out either end of the channel.

The elastomeric sheet material of this invention is easily manufactured at a low cost. This passive shock vibration element has virtually instantaneous recovery from shock. Therefore, it provides protection under dynamic, as well as static conditions. Although the elastomeric damping sheets of the present invention are illustrated and described in connection with a preferred embodiment, these damping sheets are very versatile, may be utilized for many different purposes, and may be constructed in very large and quite small sizes, in accordance with the intended application. It is not necessary, however, for the sheet to be populated with channels to the extent shown in FIG. 1. Depending on the desired application, numerous variations may be implemented within the shape of the present invention, as claimed herein, by those skilled in the art, including, but not limited to, the following, either singly or in combination:

1. A limited number of rows or columns of channels;
2. Patterns of channels aligned to form outlines of various geometrical arrangements, such as circles, squares, X's and other shapes, on the upper and lower surfaces of the elastomeric sheets;
3. Channels of different sizes;
4. Channel-filling material of different composition than the elastomeric sheet material that fill all, or only part of a channel or channels;
5. A plurality of channel-filling materials different than the sheet material;
6. Slanted channels with different orientations and angles;
7. Channels that proceed only partially through the elastomeric sheet.

Figure 4:
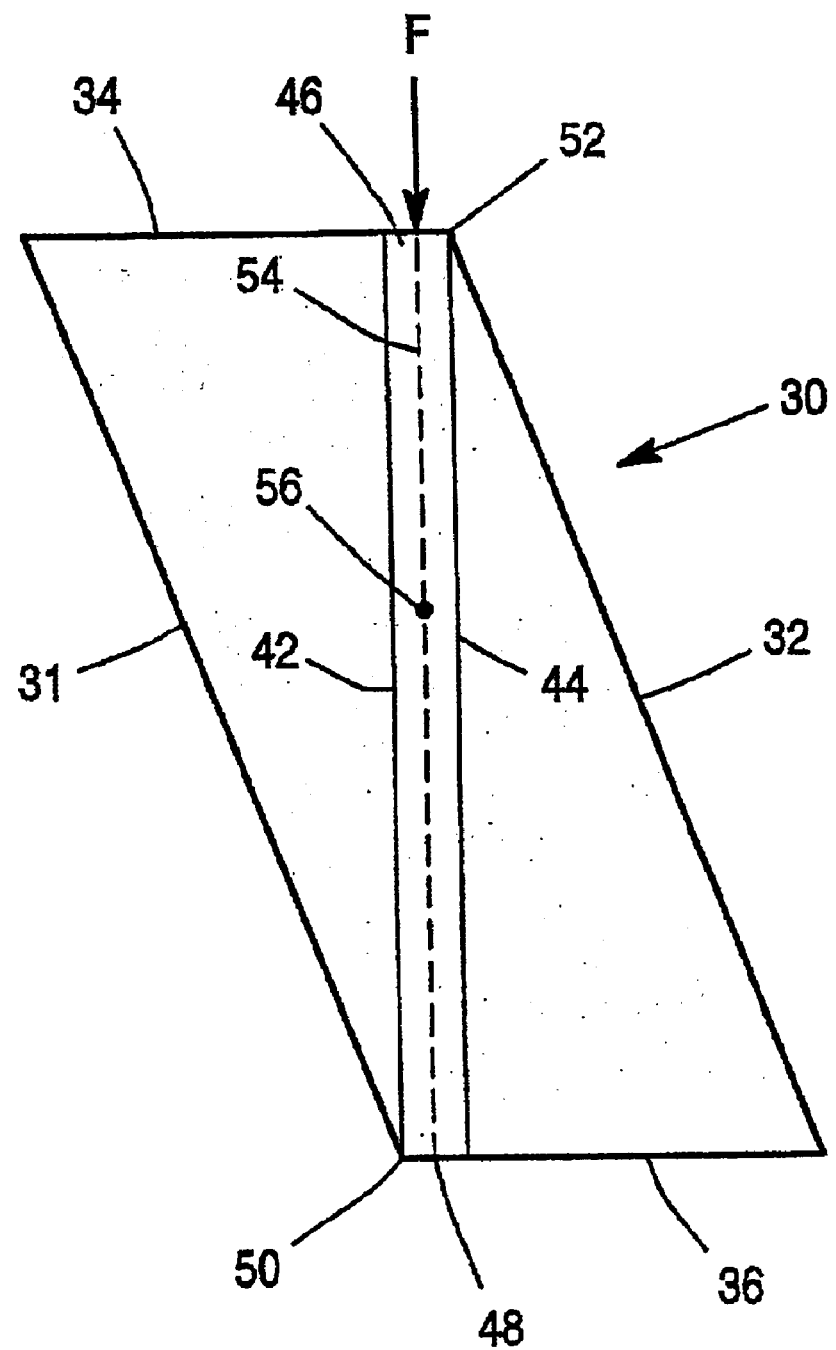
FIG. 4 is a cross-sectional view of a sample of elastomeric material that is used to determine dimensions and overlap conditions for predefined forces applied to elastomeric damping elements of the invention.

The amount of area overlap that exists can be correlated with the minimum excess dynamic force impulse value over the static force value at which it is desired to initiate appreciable damping by a damping element of the type described herein. FIG. 4 represents the manner in which this can be achieved. An elastomer sample 30 having elongated sides 31,32, upper end area 34 and bottom end area 36 may be used to determine the minimum force at which an elastomer element of the type described herein force at which an elastomer element of the type described herein may become an effective damping element.

The dimensions of this sample are deprived from a generally parallelogram-shaped elastomer element 40 that is shaped as shown in FIG. 64. When a static load is applied for a given application and the upper end area 34 and bottom end area 36 overlap to the extent defined between the lines 42,44. The overlap area portion 46 on the upper end area 34 and the overlap area 30 portion 48 of the lower end area are the result of a static force being applied normal to the surfaces 34,36.

To determine the damping characteristics of an elastomer damping element, a sample of material with the end surface areas 46,48 and the sides 42,44 is first obtained. Line 42 defines a peripheral side of the sample and extends normal to the end area 34 from the apex 50. Line 44 defines a second peripheral side of the sample that extends normal to the end area 36 from the apex 52. The sides 42,44 are substantially parallel when the normal applied force is below an initial value. In this state, a reference line 54 that is normal to the surface areas 46,48 and runs through the control 50 of the sample 30 is provided. Excess dynamic force is now applied normal to the end areas 46,48 of the sample and the buckling of the sides 42,44 of the sample in the horizontal direction of FIG. 4 is measured, preferably by an optical laser measuring instrument. This may be done by determining the deflection of the sides 42,44 from their initial position they were in when only the static force was applied relative to the reference line 54. This amount of deflection can then be correlated with the minimum excess dynamic applied force that is required to initiate damping for a particular application. In this manner, accurate and efficient design parameters may be established for this type of damping element.

What is claimed:

1. An apparatus for damping at least one of shock and vibration, comprising:

at least four of damping elements formed from an elastomeric material wherein each damping element comprises:
a first external surface having a first apex;
a second external surface having a second apex and that extends parallel to the first external surface;
four curved sides that extend between the first external surface and the second external surface;
four straight sides that extend between the first external surface and the second external surface and that extend between two of the curved sides; and
the first external surface and the second external positioned relative to one another such that a first line originating at the first apex and drawn normal to said first external surface extending through the second external surface and a second line originating at the second apex and drawn normal to the second external surface extending through the first external surface define an overlap between the first external surface and the second external surface;
the at least four damping elements connected along at least one of the four straight sides of each of the damping elements to form a sheet of elastomeric material, the at least four damping elements connected such that the at least one of the at least four curved sides of each of the at least four damping elements define at least one cavity in the sheet of elastomeric material; and
wherein a sample of the elastomeric material extending between the first external surface and the second external surface and defined between the first line and the second line is configured to buckle upon an application of a minimum dynamic force normal to at least one of the first external surface and the second external surface of each damping element.

2. The apparatus for damping at least one of shock and vibration, of claim 1, further comprising at least some of at least one of the at least one cavity filled with a damping material.

3. The apparatus for damping at least one of shock and vibration, of claim 1, wherein the damping material within the cavity has elastomeric charactertics that are different from those of the elastomeric material of the damping elements.

4. The apparatus for damping at least one of shock and vibration, of claim 1, further comprising at least some of at least one of the at least one cavity partially filled with a damping material.

5. The apparatus for damping at least one of shock and vibration, of claim 4, wherein the damping material within the cavity has elastomeric charactertics that are different from those of the elastomeric material of the damping elements.

* * * * *